US008445393B2

(12) United States Patent
Qin et al.

(10) Patent No.: US 8,445,393 B2
(45) Date of Patent: May 21, 2013

(54) LOW-DENSITY WEB AND METHOD OF APPLYING AN ADDITIVE COMPOSITION THERETO

(75) Inventors: Jian Qin, Appleton, WI (US); Donald E. Waldroup, Roswell, GA (US); Deborah Joy Calewarts, Appleton, WI (US); Charles W. Colman, Marietta, GA (US); Jeffrey F. Jurena, Appleton, WI (US); Douglas W. Stage, Appleton, WI (US); Timothy J. Young, Bay City, MI (US); Femi Kotoye, Midland, MI (US); Matthew J. Kalinowski, Freeland, MI (US); Gary M. Strandburg, Mount Pleasant, MI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 254 days.

(21) Appl. No.: 12/844,487

(22) Filed: Jul. 27, 2010

(65) Prior Publication Data

US 2012/0028004 A1 Feb. 2, 2012

(51) Int. Cl.
*B32B 5/24* (2006.01)
*B32B 27/24* (2006.01)
(52) U.S. Cl.
USPC .................. 442/417; 442/68; 442/69; 442/70; 442/72; 442/74; 442/75
(58) Field of Classification Search
USPC .................. 442/68, 69, 70, 72, 73, 74, 75, 97
See application file for complete search history.

(56) References Cited

U.S. PATENT DOCUMENTS

| | | | |
|---|---|---|---|
| 2007/0137808 | A1 | 6/2007 | Lostocco et al. |
| 2008/0009586 | A1 | 1/2008 | Vansumeren et al. |
| 2008/0118728 | A1 | 5/2008 | Magley et al. |
| 2008/0135195 | A1 | 6/2008 | Hermans et al. |
| 2008/0176968 | A1 | 7/2008 | VanSumeren et al. |
| 2008/0230195 | A1 | 9/2008 | Lang et al. |

FOREIGN PATENT DOCUMENTS

| | | |
|---|---|---|
| TW | 200907143 A | 2/2009 |
| WO | WO 2007/078537 A1 | 7/2007 |
| WO | WO 2008/064942 A1 | 6/2008 |
| WO | WO 2008/156454 A1 | 12/2008 |
| WO | WO 2008/156455 A1 | 12/2008 |
| WO | WO 2009/045731 A2 | 4/2009 |
| WO | WO 2009/064993 A1 | 5/2009 |

*Primary Examiner* — Jennifer A Steele
(74) *Attorney, Agent, or Firm* — Randall W. Fieldhack; Denise L. Stoker

(57) ABSTRACT

Sheet-like products, such as tissue products made from a low-density web, are disclosed containing an additive composition. The additive composition, for instance, comprises an aqueous dispersion containing an alpha-olefin polymer, and an ethylene-carboxylic acid copolymer. The additive composition may be applied to the surface of the web so that it does not thoroughly or even substantially penetrate the web. For instance, the additive may be applied to one or both surfaces of the web by gravure printing, press coating, spraying or the like. The additive composition may improve the strength of the tissue web and/or improve the perceived softness of the web.

6 Claims, 6 Drawing Sheets

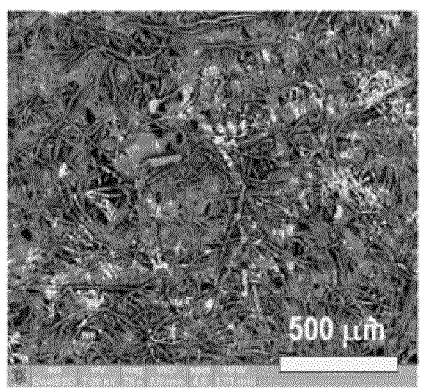
FIG. 1A, PRIOR ART
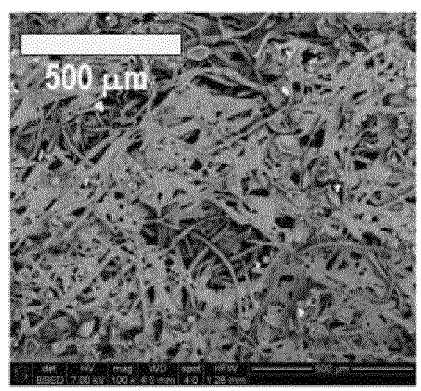
FIG. 2A
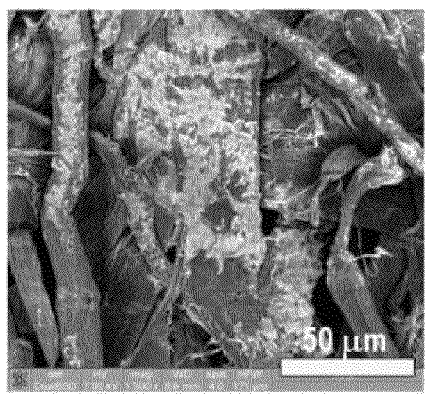
FIG. 1B, PRIOR ART
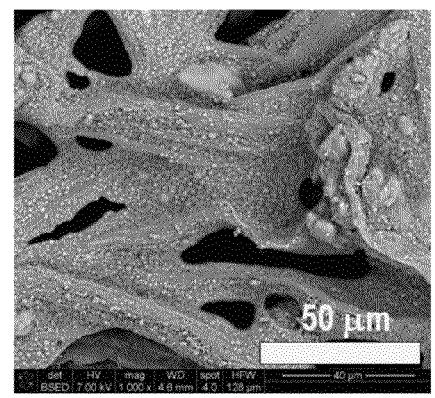
FIG. 2B

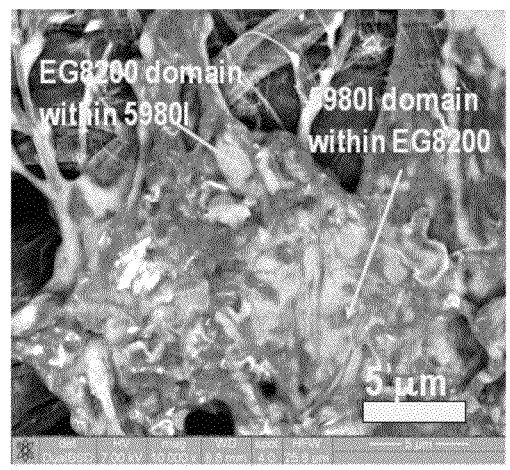
FIG. 1C, PRIOR ART
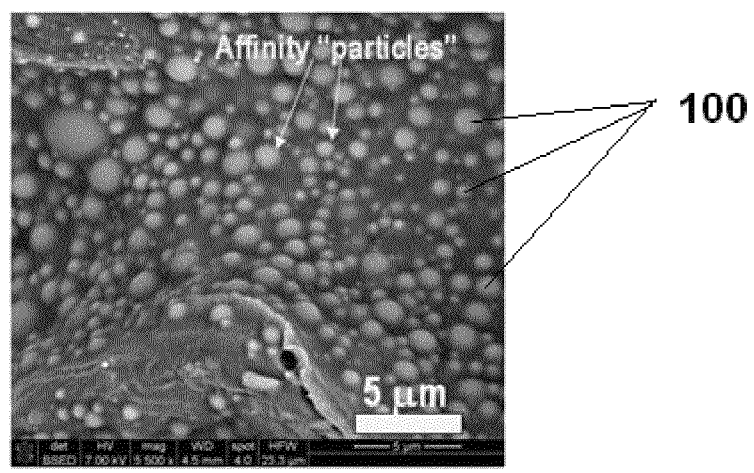
FIG. 2C

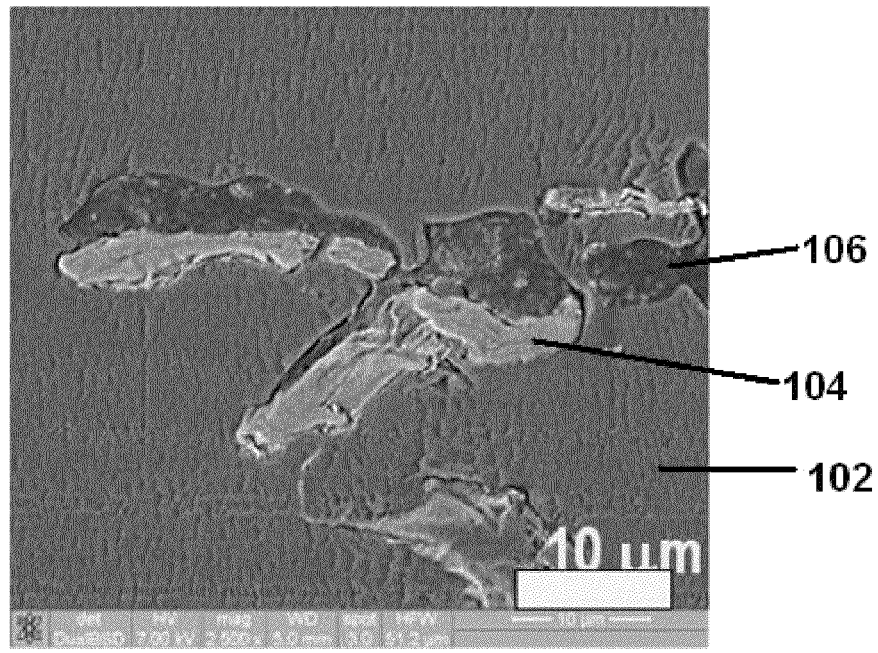
FIG. 1D, PRIOR ART
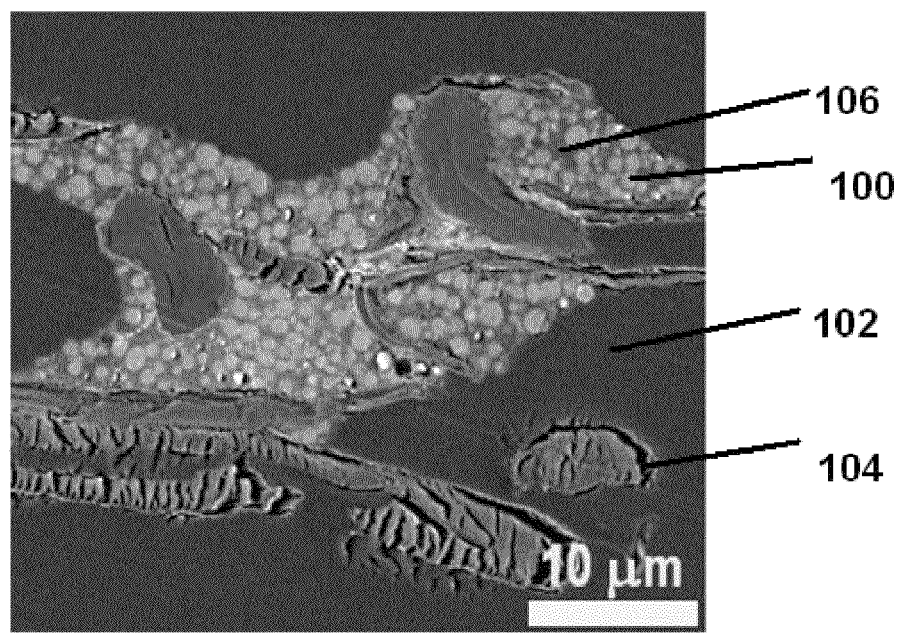
FIG. 2D

LOW-DENSITY WEB AND METHOD OF APPLYING AN ADDITIVE COMPOSITION THERETO

This invention relates to additive compositions for application to a web, and specifically, to a dispersion for coating a surface of a low-density web.

BACKGROUND

Low density webs are used to produce absorbent tissue products (e.g. facial tissues, bath tissues and other similar products) are designed to include several important properties. For example, it is desirable that the products have good bulk, a soft feel and absorbency. It is also desired that the product have good strength and resist tearing, even while wet. Unfortunately, it is very difficult to produce a high strength tissue product that is also soft and highly absorbent. Usually, when steps are taken to increase one property of the product, other characteristics of the product are adversely affected.

For instance, softness is typically increased by decreasing or reducing cellulosic fiber bonding within the tissue product. Inhibiting or reducing fiber bonding, however, adversely affects the strength of the tissue web.

Softness may be enhanced by the topical addition of a softening agent to the tissue web. In the prior art, a polymer (e.g. polyolefin) is suspended in a liquid (e.g. water) to form micro-dispersion beads. When this dispersion is applied to a Yankee dryer during a creping process, the dispersion liquid is evaporated and the remaining polymer dispersion beads melt to form a film. The molten film is then transferred onto the web (e.g. tissue) and creped off the Yankee surface to become a non-continuous polymer film on the surface of the tissue. Referring to FIGS. 1A-D, the polymer film on the creped tissue does not retain any morphological structure of its micro-dispersion beads. Although the dispersion applied by creping makes the low density webs feel softer, creping is not always an option. For a tissue machine without creping, the dispersion can be only applied onto the tissue either before drying when it is still wet or after drying in a post treatment stage. Unfortunately, if the dispersion is applied to a low density web in these two situations, it tends to penetrate the web, reduce mass efficiency, and form hydrogen bonds between pulp fibers. Hydrogen bonding creates a very stiff product that is not soft to the touch.

As such, there is a need for a method for applying a composition to a non-creped web so that the web remains soft to the touch. There is an additional need to apply a composition to a substrate that either maintains or improves the substrate tensile strength.

SUMMARY

The present invention is a method of applying an additive composition to a web or a sheet-like product made from the web. Method steps include:

(a) presenting a web having a first surface and an opposite second surface, the web having equal for greater than 50% cellulosic fibers and having a bulk of equal or greater than 3 cc/g;

(b) applying an additive composition in the form of a dispersion on at least the first surface of the web, wherein the additive composition has a viscosity of equal or greater than a value calculated by an equation of $y=40\ e^{0.07x}$, wherein y represents viscosity in a unit of centipoise, and x is a percentage of the emulsifier content calculated without water; and (c) drying the web after the step of applying the additive composition.

In another aspect of the invention is a method of applying an additive composition to a web or a sheet-like producade from the web. The method steps include: (a) presenting a web having a first surface and an opposite second surface, the web having equal or greater than 50% cellulosic fibers and having a bulk of equal or greater than 3 cc/g; and (b) applying an additive composition in the form of a dispersion on at least the first surface of the web without thoroughly penetrating the web, wherein the additive composition has a viscosity of equal or greater than a value calculated by an equation of $y=40\ e^{0.07x}$, wherein y represents viscosity in a unit of centipoise, and x is a percentage of the emulsifier content calculated without water; and wherein the additive composition includes particles having an average particle size diameter in the range of 0.1 to 3 microns, and a solids level of 30 to 60%; and (c) drying the web.

In yet another aspect is an article having a web equal or greater than 50% cellulosic fibers and having a bulk of equal or greater than 3 cc/g, and an additive composition that is printed onto the web; wherein the additive composition includes a polyolefin; and wherein the additive composition has a plurality of particles that do not thoroughly penetrate the web.

It has been discovered that the following desired goals are inter-related: (1) to keep polyolefin dispersion (POD) on the surface of a web, (2) to retain dispersing particles without a phase inversion process; and (3) to enhance the hand feel of the coating derived from POD and further improve web's softness. A relatively high viscosity POD is used so that the POD is disposed substantially on top of the web surface. The high viscosity also prevents phase inversion from occurring. Finally the coating derived from POD has a morphological structure, which promotes hand feel and softness improvement.

Other features and aspects of the present invention are discussed in greater detail below.

BRIEF DESCRIPTION OF DRAWINGS

For the purpose of illustrating the invention, there is shown in the drawings a form that is exemplary; it being understood, however, that this invention is not limited to the precise arrangements and instrumentalities shown.

FIGS. 1A, 1B, 1C are SEM photographs showing a plan view at various magnifications of a prior art sheet coated with polyolefin dispersion (POD) in a creping process;

FIG. 1D is an SEM photograph showing a cross-section of the prior art sheet shown in FIGS. 1A-C;

FIGS. 2A, 2B, 2C are SEM photographs showing a plan view at various magnifications of a sheet coated with POD in a non-creping process according to one embodiment of the present invention;

FIG. 2D is an SEM photograph showing a cross-section of the sheet shown in FIGS. 2A-C;

DETAILED DESCRIPTION

Definitions

Figure 3:
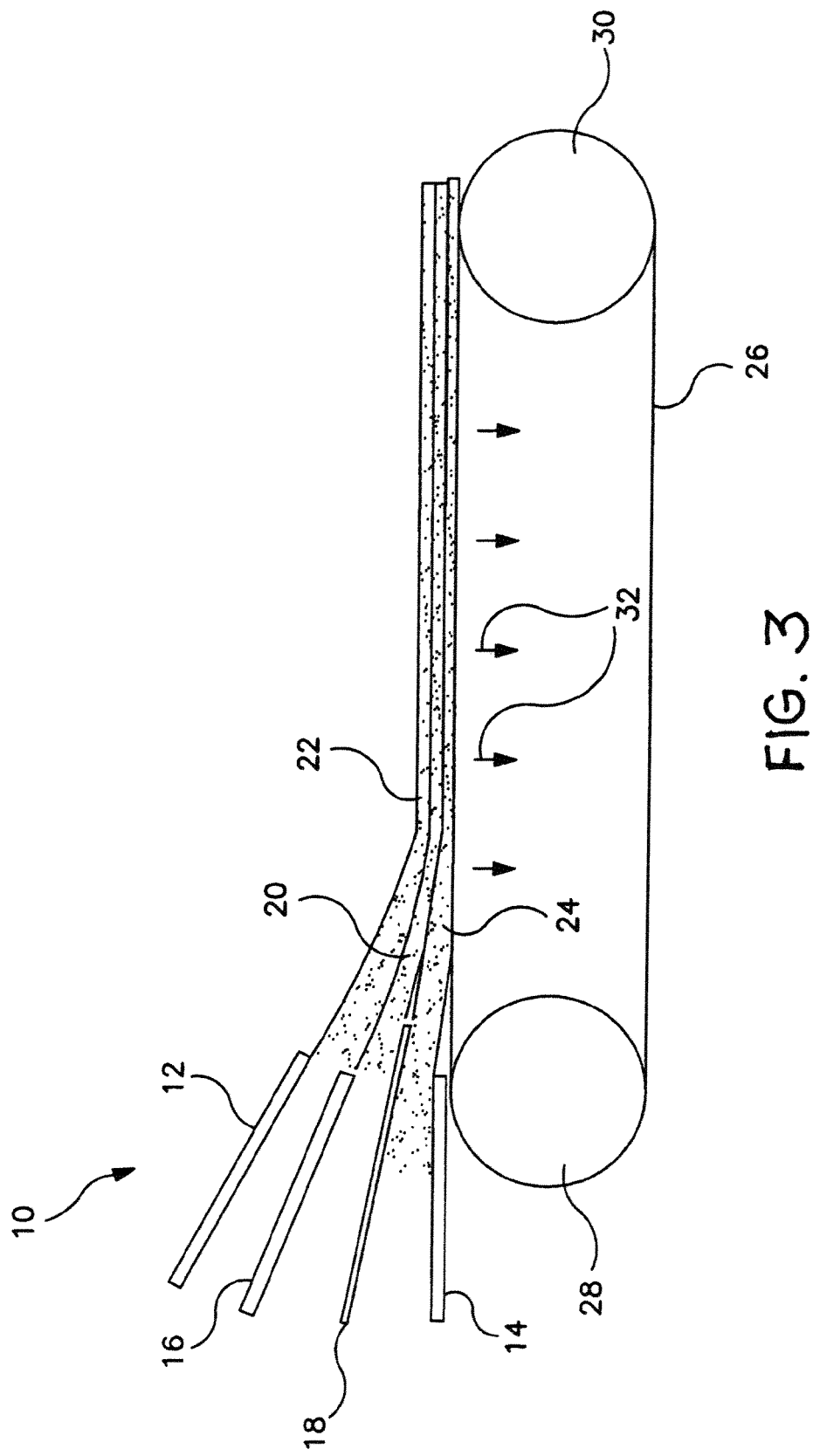
FIG. 3 is a schematic view of a device for forming a multi-layer stratified pulp furnish.

"Creping" is defined herein as a method by which an additive composition is applied to the heated surface of a Yankee dryer. The heated dryer evaporates water from the additive composition leaving behind a polymer. The web then contacts the surface of the dryer by compression so that it adheres to the polymer. The polymer and web are scraped off of the dryer surface by a creping blade. "polyolefin dispersion (POD)" is defined herein as an aqueous dispersion. POD may include an ethylene/1-octene copolymer as the base polymer (e.g. AFFINITY™ EG8200 commercially available from The Dow Chemical Company), the base polymer having a melt index of approximately 5 g/10 minutes according to ASTM D 1238, and a density in the range of 0.870 g/cc according to ASTM 792; and an ethylene acrylic acid copolymer as the stabilizing agent (e.g. PRIMACOR™ 5980i, which is commercially available from The Dow Chemical Company), the agent having a melt flow rate of approximately 13.8 g/10 minutes (measured at the time of production) and a density of approximately 0.958 g/cc; and water as the fluid medium.

It should be noted that, when employed in the present disclosure, the terms "comprises," "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The terms "stabilizing agent" and "dispersing agent" are interchangeable with each other.

It is to be understood by one of ordinary skill in the art that the present discussion is a description of exemplary embodiments only, and is not intended as limiting the broader aspects of the present disclosure.

In general, the present disclosure is directed a web and a method of incorporating an additive composition onto the surface of a web such as a low-density web in order to improve the softness of the planar articles made from the web, and to possibly improve the strength of the same. The additive composition may include a polyolefin dispersion (POD) having a relatively high viscosity. The web may be made with equal or greater than 50% cellulosic pulp and with a bulk of equal or greater 3 cc/g.

In one embodiment of the present invention, using a non-creping process, the additive composition in the form of a water dispersion may contain a relatively high solid level (approximately 40% to 50% versus less than 1% in the prior-art creped application), is applied directly onto a wet or dry tissue or other base sheet and then immediately dried by air either at an ambient or an elevated temperature. The drying period is used to evaporate the water from the dispersion, yet the dried POD layer still retains its morphological structure that it had in the liquid phase. See, FIGS. 2A-2D which show that the polymer particulates 100 remain unmelted.

A surprising result is that it is possible to print the additive composition onto the substrate and have an outcome resulting in a stronger, softer tissue (as opposed to previous methods of printing on silicone, lotion, latex, etc.).

Additive Composition

Before it is applied to a web, the additive composition is in the form of a dispersion. The dispersion comprises at least one or more base polymers such as an ethylene-based thermoplastic polymer, a propylene-based thermoplastic polymer, and mixtures thereof; at least one or more stabilizing agents; and a fluid medium. The dispersion may further include one or more fillers and/or one or more additives. Desirably, the dispersion is an aqueous dispersion. Most desirably, the additive composition is a polyolefin dispersion (POD).

Base Polymer

The aqueous dispersion comprises from 5 to 85 percent by weight of one or more base polymers, based on the total weight of the solid content of the aqueous dispersion. All individual values and subranges from 5 to 85 weight percent are included herein and disclosed herein; for example, the weight percent can be from a lower limit of 5, 8, 10, 15, 20, 25 weight percent to an upper limit of 40, 50, 60,70, 80, or 85 weight percent. For example, the aqueous dispersion may comprise from 15 to 85, or from 15 to 85, or 15 to 80, or from 15 to 75, or from 30 to 70, or from 35 to 65 percent by weight of one or more base polymers, based on the total weight of the solid content of the aqueous dispersion. The aqueous dispersion comprises at least one or more base polymers. The base polymer is a thermoplastic material. The one or more base polymers may comprise one or more olefin based polymers, one or more acrylic based polymers, one or more polyester based polymers, one or more solid epoxy polymers, one or more thermoplastic polyurethane polymers, one or more styrenic based polymers, or combinations thereof.

Examples of thermoplastic materials include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-I-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Exemplary (meth)acrylates, as base polymers, include, but are not limited to, methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, base polymer may, for example, comprise one or more polyolefins selected from the group consisting of ethylene-alpha olefin copolymers, propylene-alpha olefin copolymers, and olefin block copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the base polymer may, for example, be ethylene vinyl acetate (EVA) based polymers. In other embodiments, the base polymer may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the base polymer may, for example, be a semi-crystalline polymer and may have a melting point of less than 110° C. In another embodiment, the melting point may be from 25 to 100° C. In another embodiment, the melting point may be between 40 and 85° C.

In one particular embodiment, the base polymer is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from Exxon Mobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/alpha-olefin copolymers are further described in details in the U.S. Provisional Patent Application No. 60/988,999 and International Patent Application No. PCT/US08/082599, each of which is incorporated herein by reference.

In certain other embodiments, the base polymer, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, may be used as the base polymer. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the base polymer may, for example, comprise a polar polymer, having a polar group as either a comonomer or grafted monomer. In exemplary embodiments, the base polymer may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the base polymer may, for example, comprise a polar polyolefin selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided, however, that base polymer may, for example, have a lower acid number, measured according to ASTM D-974, than the stabilizing agent.

Besides using an alpha-olefin copolymer as the base polymer, there is a large group of polymers suitable to be used as the base polymer. The group includes, but is not limited to, vinyl acetate homopolymers, vinylacetate maleic ester copolymers, vinyl acetate ethylene copolymers, acrylic esters, styrene butadiene copolymers, carboxylated butadiene copolymers, styrene acrylic copolymers, homopolymer and copolymers of acrylate, methacrylate esters, styrene, maleinic acid di-n-butyl ester, vinyl acetate-ethylene-acrylate terpolymers, polychloroprene rubber, polyurethane, and mixtures or combinations of each polymer. One exemplary base polymer is AFFINITY EG 8200 available from Dow Chemical Company.

Stabilizing Agent

The dispersion may further comprise at least one or more stabilizing agents, also referred to herein as dispersion agents, to promote the formation of a stable dispersion. In selected embodiments, the stabilizing agent may be a surfactant, a polymer (different from the base polymer detailed above), or mixtures thereof. In certain embodiments, the stabilizing agent can be a polar polymer, having a polar group as either a comonomer or grafted monomer.

In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR, commercially available from The Dow Chemical Company. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids or fatty acid salts having from 12 to 60 carbon atoms. In some embodiments, the long chain fatty acid or fatty acid salt may have from 12 to 40 carbon atoms. In some embodiments, the stabilizing agent comprises at least one carboxylic acid, a salt of at least one carboxylic acid, or carboxylic acid ester or salt of the carboxylic acid ester. One example of a carboxylic acid useful as a dispersant is a fatty acid such as montanic acid. In some desirable embodiments, the carboxylic acid, the salt of the carboxylic acid, or at least one carboxylic acid fragment of the carboxylic acid ester or at least one carboxylic acid fragment of the salt of the carboxylic acid ester has fewer than 25 carbon atoms. In other embodiments, the carboxylic acid, the salt of the carboxylic acid, or at least one carboxylic acid fragment of the carboxylic acid ester or at least one carboxylic acid fragment of the salt of the carboxylic acid ester has 12 to 25 carbon atoms. In some embodiments, carboxylic acids, salts of the carboxylic acid, at least one carboxylic acid fragment of the carboxylic acid ester or its salt has 15 to 25 carbon atoms are preferred. In other embodiments, the number of carbon atoms is 25 to 60. Some preferred salts comprise a cation selected from the group consisting of an alkali metal cation, alkaline earth metal cation, or ammonium or alkyl ammonium cation.

In other embodiments, the dispersing agent is selected from alkyl ether carboxylates, petroleum sulfonates sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides and alkyl glycerides. Combinations any of the above-enumerated dispersing agents can also be used to prepare some aqueous dispersions.

If the polar group of the polymer is acidic or basic in nature, the polymeric stabilizing agent may be partially or fully neutralized with a neutralizing agent to form the corresponding salt. In some embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be any amine such as monoethanolamine, or 2-amino-2-methyl-I-propanol (AMP). The degree of the neutralization varies from 50 to 100 percent on a molar basis. Desirably it should be in a range of 60 to 90 percent. Those having ordinary skill in the art will appreciate that the selection of an appropriate neutralizing agent and degree of neutralization depends on the specific composition formulated, and that such a choice is within the knowledge of those of ordinary skill in the art.

Additional stabilizing agents that may be useful in the practice of the present invention include, but are not limited to, cationic surfactants, anionic surfactants, or a non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants.

Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts.

In some embodiments, the dispersing agent or stabilizing agent may be used in an amount ranging from greater than zero to 60 percent by weight based on the amount of base polymer (or base polymer mixture) used. For example, long chain fatty acids or salts thereof may be used from 0.5 to 10 percent by weight based on the amount of base polymer. In other embodiments, ethylene-acrylic acid or ethylene-methacrylic acid copolymers may be used in an amount from 0.01 to 80 percent by weight based on the weight of the base polymer; or in the alternative, ethylene-acrylic acid or ethylene-methacrylic acid copolymers may be used in an amount from 0.5 to 60 percent by weight based on the weight of the base polymer. In yet other embodiments, sulfonic acid salts may be used in an amount from 0.01 to 60 percent by weight based on the weight of the base polymer; or in the alternative, sulfonic acid salts may be used in an amount from 0.5 to 10 percent by weight based on the weight of the base polymer.

The type and amount of stabilizing agent used can also affect end properties of the cellulose-based article formed incorporating the dispersion. For example, articles having improved oil and grease resistance might incorporate a surfactant package having ethylene-acrylic acid copolymers or ethylene-methacrylic acid copolymers in an amount from 10 to 50 percent by weight based on the total amount of base polymer. A similar surfactant package may be used when improved strength or softness is a desired end property. As another example, articles having improved water or moisture resistance might incorporate a surfactant package utilizing long chain fatty acids in an amount from 0.5 to 5 percent, or ethylene-acrylic acid copolymers in an amount from 10 to 50 percent, both by weight based on the total amount of base polymer. In other embodiments, the minimum amount of surfactant or stabilizing agent is be at least 1 percent by weight based on the total amount of base polymer.

Fluid Medium

The aqueous dispersion further comprises a fluid medium. The fluid medium may be any medium; for example, the fluid medium may be water. The dispersion of the instant invention comprises 35 to 85 percent by weight of fluid medium, based on the total weight of the dispersion. In particular embodiments, the water content may be in the range of from 35 to 80, or in the alternative from 35 to 75, or in the alternative from 45 to 65 percent by weight of the fluid medium, based on the total weight of the dispersion. Water content of the dispersion may preferably be controlled so that the solids content (base polymer plus stabilizing agent) is between about 5 percent to about 85 percent by weight. In particular embodiments, the solids range may be between about 10 percent to about 75 percent by weight. In other particular embodiments, the solids range is between about 20 percent to about 70 percent by weight. In certain other embodiments, the solids range is between about 25 percent to about 60 percent by weight.

Some dispersions have a pH of from greater than 7 to about 11.5, desirably from about 8 to about 11, more desirably from about 9 to about 11. The pH can be controlled by a number of factors, including the type or strength of stabilizing agent, degree of neutralization, type of neutralization agent, type of base polymer to be dispersed, and melt kneading (e.g., extruder) processing conditions. The pH can be adjusted either in-situ, or by converting the carboxylic acid stabilizing agent to the salt form before adding it to the base polymer and forming the dispersion. Of these, forming the salt in-situ is preferred.

Fillers

The dispersion may further comprise one or more fillers. The dispersion comprises from 0.01 to 600 parts by weight of one or more fillers per hundred parts by the combined weight of the base polymer, for example, polyolefin, and the stabilizing agent. According to the previous definition, a base polymer comprises one or more than one polyolefin copolymer(s) but does not include a stabilizing agent. In certain embodiments, the filler loading in the dispersion can be from 0.01 to 200 parts by the weight of one or more fillers per hundred parts of the combined weight of the base polymer, for example, polyolefin, and the stabilizing agent. The filler material can include conventional fillers such as milled glass, calcium carbonate, aluminum trihydrate, talc, antimony trioxide, fly ash, clays (such as bentonite or kaolin clays for example), or other known fillers.

Additives for the Dispersion

The dispersion may further include additives. Such additives may be used with the base polymer, stabilizing agent, or filler used in the dispersion without deviating from the scope of the present invention. For example, additives may include, but are not limited to, a wetting agent, surfactants, anti-static agents, antifoam agent, anti block, wax-dispersion pigments, a neutralizing agent, a thickener, a compatibilizer, a brightener, a rheology modifier (which is capable of adjusting both low and/or high shear viscosities), a biocide, a fungicide, and other additives known to those skilled in the art.

Furthermore, the aqueous dispersion may further optionally include a thickener. Thickeners can be useful in the present invention to increase the viscosity of low viscosity dispersions. Thickeners suitable for use in the practice of the present invention can be any known in the art such as for instance poly-acrylate type or associate non-ionic thickeners such as modified cellulose ethers.

Dispersion Formulations

Exemplary dispersion formulations such as POD may include a base polymer, which may comprise at least one non-polar polyolefin; and a stabilizing agent, which may include at least one polar functional group or polar comonomer; water; and optionally one or more fillers and or additives. With respect to the base polymer and the stabilizing agent, in certain embodiments, the non-polar polyolefin may comprise between 30 percent to 99 percent by weight based on the total amount of base polymer and stabilizing agent in the dispersion; or in the alternative, the at least one non-polar polyolefin comprises between 50 percent and 80 percent by weight based on the total amount of base polymer and stabilizing agent in the dispersion; or in another alternative, the one or more non-polar polyolefins comprise about 70 percent by weight based on the total amount of base polymer and stabilizing agent in the dispersion.

Forming the Dispersion

The aqueous dispersion can be formed by any number of methods recognized by those having skill in the art. One of the methods for producing an aqueous dispersion comprises: (1) melt kneading the base polymer and at least one stabilizing agent, to form a melt-kneaded product; and (2) diluting the melt-kneaded product with water at certain temperature and under sufficient mechanical forces, and (3) melt kneading the resulting mixture to form the aqueous dispersion. In particular embodiments, the method includes diluting the melt kneaded product to provide a dispersion having a pH of less than 12. Some methods provide a dispersion with an average particle size of less than about 10 microns. It is important that the additive composition stay substantially at the web surface. If allowed to penetrate the web surface, hydrogen bonds will form and the web will become quite stiff after drying. Therefore, the additive composition cannot be added to the headbox or pulp slurry in the wet end prior to tissue forming but is instead applied topically after the web is formed and possibly after the web is dried.

There are several aspects of the invention that are used to prevent penetration of the additive composition into the web. One way to keep the additive composition at the surface of the web is to use a foamed additive composition. However, viscosity can be of importance, so foaming is not a necessary step when a dispersion has enough viscosity. Foam is just one way to achieve a relatively high viscosity. Other factors that aid in formulating a viscous dispersion include using a higher solid-level and/or using large particulates in the dispersion.

Before the coating composition is applied to an existing tissue web, the solids level of the coating composition may be about 30 percent or higher (that is, the coating composition comprises about 30 grams of dry solids and 70 grams of water, such as about any of the following solids levels or higher: 40 percent, 50 percent, 60 percent, 70 percent, with exemplary ranges of from 40 percent to 70 percent and more specifically from 40 percent to 60 percent).

Substrate

The substrate, for example the base sheets treated, in accordance with the present disclosure comprise at least 50% cellulosic fibers, such as pulp fibers, with a combination of synthetic fibers.

In general, any process capable of forming a base sheet can also be utilized in the present disclosure. For example, a papermaking process of the present disclosure can utilize embossing, wet pressing, air pressing, through-air drying, uncreped through-air drying, hydroentangling, air laying, coform methods, as well as other steps known in the art.

Natural fibers such as wool, cotton, flax, hemp and wood pulp may be combined with synthetic fibers. Pulp may be modified in order to enhance the inherent characteristics of the fibers and their processability.

Optional chemical additives may also be added to the aqueous papermaking furnish or to the formed embryonic web to impart additional benefits to the product and process and are not antagonistic to the intended benefits of the invention. The following materials are included as examples of additional chemicals that may be applied to the web along with the additive composition of the present invention. The chemicals are included as examples and are not intended to limit the scope of the invention. Such chemicals may be added at any point in the papermaking process, including being added simultaneously with the additive composition, wherein said additive or additives are blended directly with the additive composition.

Additional types of chemicals that may be added to the paper web include, but are not limited to, absorbency aids usually in the form of cationic, anionic, or non-ionic surfactants, humectants and plasticizers such as low molecular weight polyethylene glycols and polyhydroxy compounds such as glycerin and propylene glycol. Materials that supply skin health benefits such as mineral oil, aloe extract, vitamin e, silicone, lotions in general and the like may also be incorporated into the paper web.

In general, the products of the present invention can be used in conjunction with any known materials and chemicals that are not antagonistic to its intended use. Examples of such materials include but are not limited to odor control agents, such as odor absorbents, activated carbon fibers and particles, baby powder, baking soda, chelating agents, zeolites, perfumes or other odor-masking agents, cyclodextrin compounds, oxidizers, and the like. Superabsorbent particles, synthetic fibers, or films may also be employed. Additional options include cationic dyes, optical brighteners, humectants, emollients, and the like.

The different chemicals and ingredients that may be incorporated into the base sheet may depend upon the end use of the product. For instance, various wet strength agents may be incorporated into the product. For bath tissue products, for example, temporary wet strength agents may be used. As used herein, wet strength agents are materials used to immobilize the bonds between fibers in the wet state. Typically, the means by which fibers are held together in paper and tissue products involve hydrogen bonds and sometimes combinations of hydrogen bonds and covalent and/or ionic bonds. In some applications, it may be useful to provide a material that will allow bonding to the fibers in such a way as to immobilize the fiber-to-fiber bond points and make them resistant to disruption in the wet state. The wet state typically means when the product is largely saturated with water or other aqueous solutions.

In one aspect of the present invention the substrate is an uncreped through air dried bath tissue or "UCTAD" bath tissue. In another aspect of the present invention the substrate is a facial tissue.

Other substrate materials containing cellulosic fibers include coform webs and hydroentangled webs. In the coform process, at least one meltblown diehead is arranged near a chute through which other materials are added to a meltblown web while it is forming. Such other materials may be natural fibers, superabsorbent particles, natural polymer fibers (for example, rayon) and/or synthetic polymer fibers (for example, polypropylene or polyester), for example, where the fibers may be of staple length.

Coform processes are shown in commonly assigned U.S. Pat. No. 4,818,464 to Lau and U.S. Pat. No. 4,100,324 to Anderson et al., which are incorporated herein by reference. Webs produced by the coform process are generally referred to as coform materials. More particularly, one process for producing coform nonwoven webs involves extruding a molten polymeric material through a die head into fine streams and attenuating the streams by converging flows of high velocity, heated gas (usually air) supplied from nozzles to break the polymer streams into discontinuous microfibers of small diameter. The die head, for instance, can include at least one straight row of extrusion apertures. The coform material may contain the cellulosic material in an amount from equal or greater 50% by weight to about 80% by weight.

In addition to coform webs, hydroentangled webs can also contain synthetic and pulp fibers. Hydroentangled webs refer to webs that have been subjected to columnar jets of a fluid that cause the fibers in the web to entangle. Hydroentangling a web typically increases the strength of the web. In one embodiment, pulp fibers can be hydroentangled into a continuous filament material, such as a spunbond web. The hydroentangled resulting nonwoven composite may contain pulp fibers in an amount from equal or greater than 50% to about 80% by weight, such as in an amount of about 70% by weight. Commercially available hydroentangled composite webs as described above are commercially available from the Kimberly-Clark Corporation under the name HYDROKNIT. Hydraulic entangling is described in, for example, U.S. Pat. No. 5,389,202 to Everhart, which is incorporated herein by reference.

Once formed, the web of the present invention may be packaged in different ways. For instance, in one embodiment, the web may be cut into individual sheets and stacked prior to being placed into a package. Alternatively, the web may be spirally wound. When spirally wound together, individual sheets may be separated from an adjacent sheet by a line of weakness, such as a perforation line. Bath tissues and paper towels, for instance, are typically supplied to a consumer in a spirally wound configuration.

Tissue webs that may be treated in accordance with the present disclosure may include a single homogenous layer of fibers or may include a stratified or layered construction. For instance, the tissue web ply may include two or three layers of fibers. Each layer may have a different fiber composition. For example, referring to FIG. 3, one embodiment of a device for forming a multi-layered stratified pulp furnish is illustrated. As shown, a three-layered headbox 10 generally includes an upper head box wall 12 and a lower head box wall 14. Headbox 10 further includes a first divider 16 and a second divider 18, which separate three fiber stock layers.

Each of the fiber layers includes a dilute aqueous suspension of papermaking fibers. The particular fiber contained in each layer generally depends upon the product being formed and the desired results. For instance, the fiber composition of each layer may vary depending on whether a bath tissue product, facial tissue product or paper towel product is being produced.

Referring to FIG. 3, an endless traveling forming fabric 26, suitably supported and driven by rolls 28 and 30, receives the layered papermaking stock issuing from head box 10. Once retained on fabric 26, the layered fiber suspension passes water through the fabric as shown by arrows 32. Water removal is achieved by combinations of gravity, centrifugal force and vacuum suction depending on the forming configuration.

When forming multiple ply products, the resulting paper product may comprise two plies, three plies, or more. Each adjacent ply may contain the coating composition or at least one of the plies adjacent to one another may contain the coating composition. The individual plies can generally be made from the same or from a different fiber furnish and can be made from the same or a different process.

The tissue web bulk may also vary from about 3 cc/g to 20 cc/g, such as from about 5 cc/g to 15 cc/g. The sheet "bulk" is calculated as the quotient of the caliper of a dry tissue sheet, expressed in microns, divided by the dry basis weight, expressed in grams per square meter. The resulting sheet bulk is expressed in cubic centimeters per gram. More specifically, the caliper is measured as the total thickness of a stack of ten representative sheets and dividing the total thickness of the stack by ten, where each sheet within the stack is placed with the same side up. Caliper is measured in accordance with TAPPI test method T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., Newberg, Oreg. The micrometer has a load of 2.00 kilo-Pascals (132 grams per square inch), a pressure foot area of 2500 square millimeters, a pressure foot diameter of 56.42 millimeters, a dwell time of 3 seconds and a lowering rate of 0.8 millimeters per second.

Process

When treating webs in accordance with the present disclosure, the coating composition of the present invention is topically applied to the web, and remains on the web surface. Shown in FIGS. 2A-2C is a web treated in accordance with one embodiment of the present invention. FIGS. 2A-2C are the same web shown at different levels of magnification. When FIGS. 2A-2C are juxtaposed to the corresponding FIGS. 1A-1C, it may be observed that the coating of the present invention more thoroughly covers the surface of the web than the creped web shown in FIGS. 1A-1C. In FIG. 2C, it may also be observed that the AFFINITY 100 remains in its particulate form. In corresponding FIG. 1C, the AFFINITY is melted so that it does not retain its particulate form. It is advantageous to retain the particulate form because when polymer components of POD is in dispersion form, the base polymer AFFINITY is dispersed as particles in the dispersion surrounded by stabilizing agent PRIMACOR. In this morphological structure, hydrophobic AFFINITY is embedded in hydrophilic PRIMACOR. PRIMACOR's hydrophilic carboxylic acid functional groups are fully exposed toward the surface of the particles. In this manner of structural conformation, domains of AFFINITY and PRIMACOR appear hydrophilic or water wettable. FIGS. 2A-2D prove that the coated surface of the web by this invention will be hydrophilic or water wettable. This will be an important product attribute for tissue products. On the other hand, if the AFFINITY particles which are originally embedded in PRIMACOR went through a melting process on Yankee dryer surface, AFFINITY becomes the continuous phase while PRIMACOR becomes dispersing phase. This phase transition process is also referred to as phase inversion. After the phase inversion, the hydrophobic AFFINITY will form an "ocean" while PRIMACOR becomes "islands." In this manner of structural conformation, AFFINITY and PRIMACOR film appears hydrophobic or non-wettable. The phase inversion process is driven by several factors: ratio of AFFINITY to PRIMACOR, solids level and viscosity of POD dispersion, temperature, heating time, mechanical shearing, and a combination of all the above.

It is also discovered that the following three goals are inter-related: (1) to keep POD on the surface of a web, (2) to retain dispersing particles without a phase inversion process; and (3) to enhance the hand feel of the coating derived from POD and further improve web's softness. A relatively high viscosity POD is used so that the coating chemicals stay substantially on top of the web surface. The high viscosity also prevents phase inversion from occurring. Finally the coating derived from POD morphological structure and surface concentration promotes hand feel and softness improvement.

The web of FIGS. 1D and 2D was formed by encasing each web in a resin 102. The resin 102 surrounds the fibers from the topical surface of the web. As can be seen, the AFFINITY particles 100 remain at the surface of the fiber 104. The polymer components of POD 106 shown in FIG. 1D was melted whereas the polymer components of POD 106 shown in the FIG. 2D is unmelted and retains its base polymer morphological structure after drying similar to that in the liquid dispersion.

To topically apply the additive composition to a paper web, the coating composition may be sprayed onto the web, extruded onto the web, or printed onto the web. When extruded onto the web, any suitable extrusion device may be used, such as a slot-coat extruder or a melt blown dye extruder. When printed onto the web, any suitable printing device may be used.

The coating composition may be applied or incorporated at any point in the paper manufacturing process after the web is formed. When applied topically, the coating composition can be applied to the web when the web is wet or dry. The point during the process at which the coating composition is incorporated into the substrate may depend upon the desired end properties of the final product. Incorporation points may include co-application in the wet end of the process, post treatment after drying but on the paper machine and topical post treatment. Incorporation of the coating composition of the present invention onto or in the substrate may be achieved by any of several methods, as illustrated by the following non-limiting descriptions.

In one embodiment, a coating composition spray can be applied to a paper web. For example, spray nozzles may be mounted over a moving web to apply a desired dose of a solution to the web that may be moist or substantially dry. Nebulizers may also be used to apply a light mist to a surface of a web.

In another embodiment, the coating composition can be printed onto a paper web, such as by offset printing, gravure printing, flexographic printing, ink jet printing, digital printing of any kind, and the like.

In yet another embodiment, the coating composition can be coated onto one or both surfaces of a paper web, such as pre-metered size coating, blade coating, air knife coating, short dwell coating, cast coating, and the like.

In a further embodiment, the coating composition can be extruded onto the surface of a paper web. For example, extrusion process is disclosed in PCT Publication No. WO 2001/12414, which published on Feb. 22, 2001, herein incorporated by reference to the extent that it is non-contradictory herewith.

Topical application of the coating composition to a paper web may occur prior to drum drying in the process described above. In addition to applying the coating composition during formation of the paper web, the coating composition may also be used in post-forming processes.

Once a paper web is formed and dried, in one embodiment, the coating composition may be applied to the web. In general, the coating composition may be applied to only one side of the web, or the coating composition may be applied to each side of the web.

Figure 5:
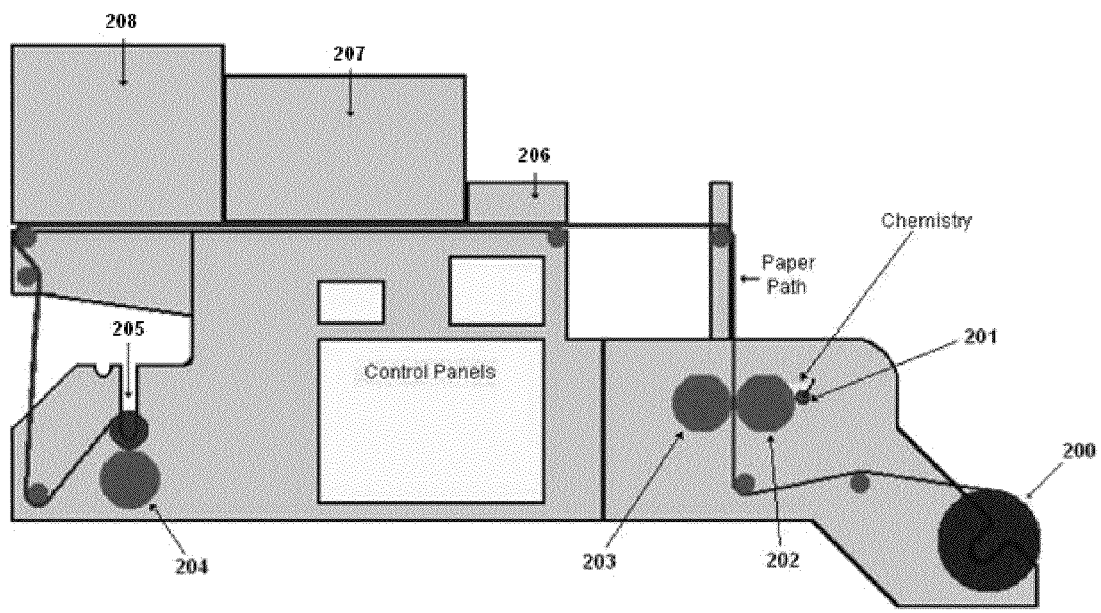
FIG. 5 is a schematic of a pre-meter size press used in one embodiment of the present invention.

In one embodiment, a pre-meter size press uses an indirect application process where fluid chemistry is applied to a web via a transfer/applicator roll 202. The process starts with a roll of web material that is to be treated. This roll is first threaded through the pre-meter size press machine as shown in FIG. 5. The roll to be treated is loaded in the unwind roll-station 200. The web is threaded from the unwind roll 200 through the nip between the transfer/applicator roll #202 and the backing roll 203. From there the web is threaded through the drying section of the machine. For the machine that is shown, there are three different dryers that can be used. In most cases, air dryer 1 207 and air dryer 2 208 are used; however, there is also an option to use an infrared dryer 206. After the dryer section, the sheet is threaded onto a coreshaft that lays on the reel drum 204. The machine is started and runs at a slow speed to ensure that the web will not break. Liquid chemistry is then added to the nip created between the Mayer rod 201 and the transfer/applicator roll 202. It should be noted that the Mayer rod 201 is a "grooved" rod which controls the volume of liquid that is put onto the transfer/applicator roll 202. The Mayer rod 201 comes in different "groove" patterns that allow different volumes of liquid to be put onto the transfer/applicator roll 202. It should also be noted that the Mayer rod 201 rotates in the opposite direction of the transfer/applicator roll 202 to control the volume of applied liquid. The liquid that is to be applied to the web is disposed on the transfer/applicator roll 202.

The liquid chemistry is applied to the web at the nip between the transfer/applicator roll 202 and the backing roll 203. The nip opening size is determined by the operator. Sometimes closed nips are used, while other times the nip is slightly open which allows less deformity of the web due to nip pressure. As shown in the diagram, only one side of the web is coated with chemistry. However, there is also an option to coat both sides of the tissue with a machine configuration change where the backing roll 203 is replaced with a transfer/applicator roll. As the web goes through the nip, liquid transfers from the transfer/applicator roll 202 to the web.

After the chemistry is applied and the web is run through a dryer section of the machine, as shown in the diagram, see infrared dryer 206, air dryer one 207 and air dryer two 208. Depending on the desired wetness/dryness of the sheet, the temperature of the dryers lowered or raised as needed. After the web has been dried, it is rolled up as a treated roll on top of the reel drum 204.

Exemplary coating weight of the polyolefin ranges from 2.5 to 300 kg polyolefin per metric ton (5 to 600 lb. of polymer per ton) of final product, e.g. cellulosic based article. An alternative exemplary coating weight of the polyolefin ranges from 5 to 150 kg per metric ton (10 to 300 lb. of polymer per ton) of final product, e.g. cellulosic based article. Another alternative exemplary thickness for the dried coating ranges from 10 to 100 kg polyolefin per metric ton (20 to 200 lb. per ton).

In certain embodiments, the coated article may have a coat weight of less than 50 g/m2. In an alternative embodiment, the coated article may have a coat weight of less than 40 g/m². In an alternative embodiment, the coated article may have a coat weight of less than 30 g/m². In an alternative embodiment, the coated article may have a coat weight of less than 20 g/m². In an alternative embodiment, the coated article may have a coat weight of less than 10 g/m². In an alternative embodiment, the coated article may have a coat weight in the range of 1 to 10 g/m²; or in another embodiments, the coated article may have a coat weight in the range of 0.1 and 5.0 g/m².

In certain embodiments, the coated article may have a coating thickness in the range of 0.1 to 100 microns. All individual values and sub-ranges from 0.1 to 100 microns are included herein and disclosed herein; for example, the coated article may have a coating thickness from a lower limit of 0.1, 1, 5, 10, 15, 20, 30, 40, 50, 60, 70, 80, or 90 microns to an upper limit of 5, 10, 20, 30, 40, 50, 60, 70, 80, 90, 95 or 100 microns. For example, the coated article may have a coating thickness in the range of 0.1 to 15, 0.1 to 10 microns, or 0.1 to 5 microns.

Embodiments of the present invention may be used in an "in-line process," that is during the manufacturing of the paper, or in an off-line application. One example is where paper is previously clay-coated on a machine. Then, that product may have the coating composition applied as an alternative to an extrusion coated structures.

In order to apply the coating composition onto the surface of the web and keep the composition on the surface without significant penetration, particle size, viscosity and solids level of a coating dispersion play an important role. If a dispersion has its dispersion particles large enough in size, for example, the particle size is larger than opening size of the web substrate, no matter how low its viscosity or solids level the dispersion has, the coating composition will stay on the surface of the web. In reality, a dispersion having large particle size tends to be very unstable. POD has an average particle size diameter in the range of less than 5 microns, or furthermore less than 2 microns, or for example in the range of 0.1 to 5 microns, or in the alternative, in the range of 0.1 to 3μ. The degree of penetration of such a dispersion composition will be determined by its viscosity and solids level. As its viscosity increases, or its solids level increases, the coating composition of the dispersion reduces its degree of penetration. Most of time, when a dispersion increases its solids level, it usually results in an increased viscosity. However, if a viscosity modifier (or thickener) is used, the solids level may be decoupled from viscosity. A constant solids level of a dispersion and an increase the dispersion viscosity can be obtained by increasing the add-on level of a viscosity modifier. Another way to decouple viscosity of a dispersion from its solid level is to use a foam structure to increase its viscosity while maintaining a constant solid level.

Drying

The coating composition incorporated onto or into, for example, the substrate, as described hereinabove, may be dried via any conventional drying method.

Such conventional drying methods include but, are not limited to, air drying, convection oven drying, hot air drying, microwave oven drying, and/or infrared oven drying.

The coating composition incorporated onto the substrate may be dried at any temperature; for example, it may be dried at a temperature in the range of equal or greater than the melting point temperature of the base polymer; or in the alternative, it may be dried at a temperature in the range of less than the melting point of the base polymer. The coating composition incorporated onto the substrate may be dried at a temperature in the range of 25° C. to 200° C., for example, 70° C. to 100° C.

Drying the coating composition incorporated onto the substrate at a temperature in the range of less than the melting point temperature of the base polymer can facilitate the formation of a film having a continuous stabilizing agent phase with a discrete base polymer phase dispersed therein.

Drying the coating composition incorporated onto the substrate at a temperature in the range of greater than the melting point temperature of the base polymer can facilitate the formation of a film having a continuous base polymer phase with a discrete stabilizing agent phase dispersed therein.

In some embodiments there is a second drying that is at a temperature that is higher than the first drying. For instance, the first drying temperature may be at 70° C. and the second drying at 100° C.

Test Methods (1) In-Hand Ranking Test for Tactile Properties (IHR Test):

The In-Hand Ranking Test (IHR) is a basic assessment of in-hand feel of fibrous webs and assesses attributes such as softness and stiffness. It can provide a measure of generalizability to the consumer population.

The Softness test involves evaluating the velvety, silky or fuzzy feel of the tissue sample when rubbed between the thumb and fingers. The Stiffness test involves gathering a flat sample into one's hand and moving the sample around in the palm of the hand by drawing the fingers toward the palm and evaluating the amount of pointed, rigid or cracked edges or peaks felt.

Rank data generated for each sample code by the panel are analyzed using a proportional hazards regression model. This model assumes computationally that the panelist proceeds through the ranking procedure from most of the attribute being assessed to least of the attribute. The softness and stiffness test results are presented as log odds values. The log odds are the natural logarithm of the risk ratios that are estimated for each code from the proportional hazards regression model. Larger log odds indicate the attribute of interest is perceived with greater intensity.

The IHR is employed to obtain a holistic assessment of softness and stiffness, or to determine if product differences are humanly perceivable. This panel is trained to provide assessments more accurately than an average untrained consumer might provide. The IHR is useful in obtaining a quick read as to whether a process change is humanly detectable and/or affects the softness or stiffness perception, as compared to a control. The difference of the IHR Softness Data between a treated web and a control web reflects the degree of softness improvement. Since the IHR results are expressed in log odds, the difference in improved softness is actually much more significant than the data indicates. For example, when the difference of IHR data is 1, it actually represents 10 times ($10^1$=10) improvement in overall softness, or 1,000% improvement over its control. For another example, if the difference is 0.2, it represents 1.58 times ($10^{0.2}$=1.58) or a 58% improvement.

The data from the IHR can also be presented in rank format. The data can generally be used to make relative comparisons within tests as a product's ranking is dependent upon the products with which it is ranked. Across-test comparisons can be made when at least one product is tested in both tests.

(2) Sheet Bulk Test

Sheet bulk is calculated as the quotient of the sheet caliper of a conditioned fibrous sheet, expressed in microns, divided by the conditioned basis weight, and expressed in grams per square meter. The resulting sheet bulk is expressed in cubic centimeters per gram. More specifically, the sheet caliper is the representative thickness of a single sheet measured in accordance with TAPPI test methods T402 "Standard Conditioning and Testing Atmosphere For Paper, Board, Pulp Handsheets and Related Products" and T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., Newberg, Oreg. The micrometer has a load of 2 kilo-Pascals, a pressure foot area of 2500 square millimeters, a pressure foot diameter of 56.42 millimeters, a dwell time of 3 seconds and a lowering rate of 0.8 millimeters per second.

(3) Geometric Mean Tensile (GMT) Strength

As used herein, the "geometric mean tensile (GMT) strength" is the square root of the product of the machine direction tensile strength multiplied by the cross-machine direction tensile strength. The "machine direction (MD) tensile strength" is the peak load per 3 inches (76.2 mm) of sample width when a sample is pulled to rupture in the machine direction. Similarly, the "cross-machine direction (CD) tensile strength" is the peak load per 3 inches (76.2 mm) of sample width when a sample is pulled to rupture in the cross-machine direction. The "stretch" is the percent elongation of the sample at the point of rupture during tensile testing. The procedure for measuring tensile strength is as follows.

Samples for tensile strength testing are prepared by cutting a 3 inches (76.2 mm) wide by 5 inches (127 mm) long strip in the machine direction (MD) or cross-machine direction (CD) orientation using a JDC Precision Sample Cutter (Thwing-Albert Instrument Company, Philadelphia, Pa., Model No. JDC 3-10, Serial No. 37333). The instrument used for measuring tensile strength is an MTS Systems Insight 1 Material Testing Work Station. The data acquisition software is MTS TestWorks® 4 (MTS Systems Corp., 14000 Technology Driver, Eden Prairie, Minn. 55344). The load cell is selected from either a 50 Newton or 100 Newton maximum (S-Beam TEDS ID Load Cell), depending on the strength of the sample being tested, such that the majority of peak load values fall between 10-90% of the load cell's full scale value. The gauge length between jaws is 4±0.04 inches (101.6±1 mm). The jaws are operated using pneumatic-action and are rubber coated. The minimum grip face width is 3 inches (76.2 mm), and the approximate height of a jaw is 0.5 inches (12.7 mm). The crosshead speed is 10±0.4 inches/min (254±1 mm/min), and the break sensitivity is set at 65%. The data is recorded at 100 hz. The sample is placed in the jaws of the instrument, centered both vertically and horizontally. The test is then started and ends when the specimen breaks. The peak load is recorded as the "MD tensile strength" or the "CD tensile strength" of the specimen. At least six (6) representative specimens are tested for each product or sheet, taken "as is", and the arithmetic average of all individual specimen tests is the MD or CD tensile strength for the product or sheet. Tensile strength test results are reported in units of grams-force (gf).

(4) Viscosity Test

Viscosity is measured using a Brookfield Viscometer, model RVDV-II+, available from Brookfield Engineering Laboratories, Middleboro, Mass. Measurements are taken at room temperature (23 C), at 100 rpm, with either spindle 4 or spindle 6, depending on the expected viscosity. Viscosity measurements are reported in units of centipoise (cP).

EXAMPLE 1

The following example illustrates the present invention but is not intended to limit the scope of the invention. The following example of the instant invention demonstrates how different PODs affect the performance and properties of an exemplary substrate such as UCTAD (uncreped through air-dried) bath tissue.

Significance ranking was at 95% confidence. Only one code, KLEENEX Facial Tissue with Lotion, is a facial tissue product which has POD creped onto its surface. The rest of all other codes are UCTAD bath tissues. The bath tissues have a different basis weight and structure from the facial tissue. Therefore KLEENEX facial tissue is only used as a reference point. Other two commercial bath tissue products, COTTONELLE ULTRA and COTTONELLE, has a similar tissue structure and surface morphology but were either treated by different chemicals, such as lotion, or had a different basis weight. The control was an experimentally produced UCTAD bath tissue. The control was also processed by the PMSP process meaning it went through the PMSP coating machine without any POD surface addition. All 22 sample codes were produced by surface coating the experimentally produced UCTAD bath tissue with different PODs at different processing conditions using the PMSP coating unit (FIG. 3). Therefore, any softness and other mechanical properties improvement of the surface coating is compared to the Control code. The results show that regardless of what the POD chemistries are, surface coating of POD by the PMSP technology improves the tissue softness when its add-on level of the chemical is around 0.5% to 1.5%.

TABLE 1

Sensory Panel Results of All Codes

| Code | Log Odds Softness | Significance | % Solids** | VISCOSITY (cP) | Particle size (Micron) | Temperature (° F.) | % Affinity* EG8200 | % Affinity* GA1900 | DSC % Add-on | GMT gf |
|---|---|---|---|---|---|---|---|---|---|---|
| Commercial Kleenex Facial Tissue with Lotion (creped) | 1.07 | B | — | — | — | — | — | — | — | 500 |
| Sample 1 (S5) | 0.82 | BC | 45.6 | 8300 | — | 180 | 60 | — | 1.6% | 694 |
| Sample 2 (O17) | 0.78 | BCD | 43.6 | 40 | 0.96 | 180 | 90 | — | — | 603 |
| Sample 3 (S7) | 0.68 | BCDE | 39.4 | 760 | — | 180 | 60 | — | — | 649 |
| Sample 4 (S8) | 0.60 | BCDEF | 45.6 | 97 | — | 180 | 80 | — | — | 604 |
| Sample 5 (S6) | 0.44 | CDEFG | 42.9 | 2680 | — | 180 | 60 | — | — | 711 |
| Sample 6 (O14) | 0.34 | CDEFGH | 57.3 | 1550 | 1.17 | 180 | 80 | — | — | 636 |
| Sample 7 (S15) | 0.32 | DEFGH | 44.0 | 4660 | — | 180 | — | 60 | — | 570 |
| Sample 8 (O13) | 0.31 | DEFGHI | 44.8 | 1160 | 0.80 | 180 | 60 | — | 0.3% | 656 |
| Sample 9 (O15) | 0.19 | EFGHIJ | 40.2 | 50 | 0.99 | 180 | 80 | — | — | 627 |
| Sample 10 (S14) | 0.18 | EFGHIJ | 47.8 | 260 | — | 180 | — | 80 | — | 584 |
| Sample 11 (S10) | 0.18 | FGHIJ | 39.9 | 1400 | — | 180 | — | 60 | — | 596 |
| Sample 12 (O10) | 0.05 | GHIJK | 47.8 | 1860 | 1.36 | 180 | 60 | — | 1.5% | 605 |
| Sample 13 (S9) | 0.00 | GHIJK | 51.4 | 110 | — | 180 | 90 | — | — | 603 |
| Commercial Bath Tissue Cottonelle ULTRA | -0.04 | GHIJKL | — | — | — | — | — | — | — | 867 |
| Sample 14 (O4) | -0.05 | HIJKL | 45.6 | 8300 | — | 75 | 60 | — | — | 681 |
| Sample 15 (O16) | -0.09 | HIJKL | 61.9 | 820 | 0.96 | 180 | 90 | — | — | 605 |
| Sample 16 (O12) | -0.17 | IJKL | 50.6 | 25680 | 0.79 | 180 | 60 | — | — | 673 |
| Sample 17 (S11) | -0.23 | JKL | 34.1 | 370 | — | 180 | — | 60 | — | 675 |
| Sample 18 (O3) | -0.25 | JKL | 42.9 | 2680 | — | 75 | 60 | — | — | 612 |
| Sample 19 (S13) | -0.26 | JKL | 50.9 | 420 | — | 180 | — | 80 | — | 586 |
| Sample 20 (O7) | -0.36 | KLM | 42.0 | 525 | — | 75 | 60 | — | — | 645 |
| Sample 21 (O11) | -0.39 | KLM | 37.2 | 60 | 1.50 | 180 | 60 | — | — | 673 |
| Sample 22 (O8) | -0.49 | LMN | 35.8 | 70 | 0.80 | 180 | 60 | — | — | 689 |
| Control (O1) | -0.79 | MN | — | — | — | 75 | — | — | — | 628 |
| Commercial Bath Tissue Cottonelle Mainline | -0.94 | N | — | — | — | — | — | — | — | 653 |

*Percent AFFINITY specifies the amount of AFFINITY in an AFFINITY/PRIMACOR blend. For example, if there is 60% AFFINITY in the blend, then there is 40% PRIMACOR in the blend. The percentage is for a dry blend only, and does not include water.
**Percent solid represents how much the dry weight of solid content (AFFINITY + PRIMACOR) is in the POD.

Referring to Table 1, there were three commercial tissue products, one experiment UCTAD bath tissue and 22 sample codes for the sensory panel study. All codes listed in Table 1 were arranged from the most to the least in terms of their softness ranking (Log Odds Softness values) from this study.

Table 2 lists part of the codes from Table 1 which were all surface coated with POD with the same AFFINITY/PRIMACOR ratio (60/40 wt %). In this table, softness (Log Odds) as well as mechanical properties (GMT) of the treated tissues are dependent upon several factors, such as percent solids, viscosity, dispersion particle size, and heating temperature. In general, GMT tends to be slightly enhanced by the POD surface coating, meaning that the coating will make the treated tissue stronger. The effects of percent solids and viscosity on softness are similar. When the POD percent solid or viscosity is too low, (for example, Codes 21 and 22 which have percent solids and viscosity in a range of 35% to 37% and 60 to 70 cP respectively), softness improvement was not significant due to penetration of most POD into tissue cellulose structure. As both parameters increase, softness is enhanced indicating that more POD is able to stay on the surface of the treated tissue. However, the improvement does not follow a linear relationship. When a POD has too high percent solids or viscosity (i.e., Sample 16), its improvement may be slightly reduced. It is believed that this may be caused by non-uniform coverage of POD on the tissue surface due to extremely high viscosity. It is possible that the dispersion particle size should be a factor that affects the percentage of POD that stays on the surface. However, in this study, it was not possible to produce a wide range of particle size change. However, in general, the larger the dispersion particle size is, the more significant is the improvement of tissue softness. It was found that high temperature drying is not necessary to gain softness improvement, but it significantly enhances the effect. This is demonstrated by a head-to-head sample comparison between Sample 1 and Sample 14, and Sample 5 and Sample 18.

(i.e., EG 8200 vs. GA 1900). As the AFFINITY/PRIMACOR ratio changes from 60/40 to 80/20 and 90/10, it is noted that softness improvement is enhanced when the viscosities are relatively close (Samples 21, 9 and 2). This indicates that AFFINITY impacts softness improvement more than PRIMACOR. There is a similar viscosity effect on softness improvement for an AFFINITY/PRIMACOR ratio at 80/20 (Samples 9 vs. 6). The higher the viscosity, the more the treated tissue has softness improvement. However, for POD with an AFFINITY/PRIMACOR ratio at 90/10, the effect of viscosity on softness improvement is not clear (Samples 2, 13, and 15). It was observed that during the coating process, when the ratio got to as high as 90/10, POD's stability is largely reduced due to insufficient PRIMACOR. PRIMACOR acts as an emulsifier to stabilize the dispersion. When the POD's viscosity is higher, the instability is enhanced. This causes part of the dispersion to precipitate and further negatively impact the surface coating uniformity and morphology.

GA 1900 is a lower molecular weight version of AFFINITY. For those codes specified as GA 1900, the dispersions were made by mixing GA 1900 as AFFINITY to replace EG 8200 with PRIMACOR. There were two AFFINITY/PRIMACOR ratios for GA 1900 POD: 80/20 and 60/40. In general, there is not any benefit to use GA 1900 in comparison with EG 8200. For example, at a 60/40 AFFINITY/PRIMACOR ratio, EG 8200 can have a better softness improvement over GA 1900 at a lower viscosity (Samples 5 vs. 7 and

TABLE 2

Sensory Panel Results of Codes Having the Same AFFINITY/PRIMACOR Ratio

| Code | Log Odds Softness | Significance | % Solids | VISCOSITY cP | Particle size (Micron) | Temperature (° F.) | % Affinity EG8200 | DSC % Add-on | GMT gf |
|---|---|---|---|---|---|---|---|---|---|
| Sample 1 (S5) | 0.82 | BC | 45.6 | 8300 | — | 180 | 60 | 1.6% | 694 |
| Sample 3 (S7) | 0.68 | BCDE | 39.4 | 760 | — | 180 | 60 | — | 649 |
| Sample 5 (S6) | 0.44 | CDEFG | 42.9 | 2680 | — | 180 | 60 | — | 711 |
| Sample 8 (O13) | 0.31 | DEFGHI | 44.8 | 1160 | 0.80 | 180 | 60 | 0.3% | 656 |
| Sample 12 (O10) | 0.05 | GHIJK | 47.8 | 1860 | 1.36 | 180 | 60 | 1.5% | 605 |
| Sample 14 (O4) | −0.05 | HIJKL | 45.6 | 8300 | — | 75 | 60 | — | 681 |
| Sample 16 (O12) | −0.17 | IJKL | 50.6 | 25680 | 0.79 | 180 | 60 | — | 673 |
| Sample 18 (O3) | −0.25 | JKL | 42.9 | 2680 | — | 75 | 60 | — | 612 |
| Sample 20 (O7) | −0.36 | KLM | 42.0 | 525 | — | 75 | 60 | — | 645 |
| Sample 21 (O11) | −0.39 | KLM | 37.2 | 60 | 1.50 | 180 | 60 | — | 673 |
| Sample 22 (O8) | −0.49 | LMN | 35.8 | 70 | 0.80 | 180 | 60 | — | 689 |
| Control (O1) | −0.79 | MN | — | — | — | 75 | — | — | 628 |

In Table 3, another two factors are reviewed: AFFINITY/PRIMACOR ratio and a low molecular version of AFFINITY Samples 8 vs. 11). The same effect was found for POD with an AFFINITY/PRIMACOR ratio of 80/20 (Samples 9 vs. 10).

TABLE 3

Sensory Panel Results of Codes Having the Different AFFINITY/PRIMACOR Ratios and Different AFFINITY

| Code | Log Odds Softness | Significance | % Solids | VISCOSITY cP | Particle size (Micron) | Temperature (° F.) | % Affinity EG8200 | % Affinity GA1900 | DSC % Add-on | GMT gf |
|---|---|---|---|---|---|---|---|---|---|---|
| Sample 2 (O17) | 0.78 | BCD | 43.6 | 40 | 0.96 | 180 | 90 | — | — | 603 |
| Sample 5 (S6) | 0.44 | CDEFG | 42.9 | 2680 | — | 180 | 60 | — | — | 711 |
| Sample 6 (O14) | 0.34 | CDEFGH | 57.3 | 1550 | 1.17 | 180 | 80 | — | — | 636 |
| Sample 7 (S15) | 0.32 | DEFGH | 44.0 | 4660 | — | 180 | — | 60 | — | 570 |
| Sample 8 (O13) | 0.31 | DEFGHI | 44.8 | 1160 | 0.80 | 180 | 60 | — | 0.3% | 656 |
| Sample 9 (O15) | 0.19 | EFGHIJ | 40.2 | 50 | 0.99 | 180 | 80 | — | — | 627 |

TABLE 3-continued

Sensory Panel Results of Codes Having the Different AFFINITY/PRIMACOR Ratios and Different AFFINITY

| Code | Log Odds Softness | Significance | % Solids | VISCOSITY cP | Particle size (Micron) | Temperature (° F.) | % Affinity EG8200 | % Affinity GA1900 | DSC % Add-on | GMT gf |
|---|---|---|---|---|---|---|---|---|---|---|
| Sample 10 (S14) | 0.18 | EFGHIJ | 47.8 | 260 | — | 180 | — | 80 | — | 584 |
| Sample 11 (S10) | 0.18 | FGHIJ | 39.9 | 1400 | — | 180 | — | 60 | — | 596 |
| Sample 12 (O10) | 0.05 | GHIJK | 47.8 | 1860 | 1.36 | 180 | 60 | — | 1.5% | 605 |
| Sample 13 (S9) | 0.00 | GHIJK | 51.4 | 110 | — | 180 | 90 | — | — | 603 |
| Sample 15 (O16) | −0.09 | HIJKL | 61.9 | 820 | 0.96 | 180 | 90 | — | — | 605 |
| Sample 17 (S11) | −0.23 | JKL | 34.1 | 370 | — | 180 | — | 60 | — | 675 |
| Sample 19 (S13) | −0.26 | JKL | 50.9 | 420 | — | 180 | — | 80 | — | 586 |
| Sample 21 (O11) | −0.39 | KLM | 37.2 | 60 | 1.50 | 180 | — | 60 | — | 673 |
| Sample 22 (O8) | −0.49 | LMN | 35.8 | 70 | 0.80 | 180 | — | 60 | — | 689 |
| Control (O1) | −0.79 | MN | — | — | — | 75 | — | — | — | 628 |

EXAMPLE 2

The following example illustrates effect of PRIMACOR content on viscosity of POD and further, the hand feel of the surface coated webs. Three types of PODs were chosen with a PRIMACOR content at 40%, 20% and 10% and an AFFINITY content at 60%, 80%, and 90% respectively. A wide range of viscosities of these three types of POD were produced and surface coated onto the UCTAD bath tissue using the premetered size press coating unit (FIG. 5).

The treated bath tissues were hand felt in accordance with the IHR test method (supra). These hand testing results are listed in Table 4. In Table 4, those boxes with bold numbers indicate that softness improvement of the uncreped through air dried ("UCTAD") bath tissue treated with the POD. The POD is applied to the webs for the purpose of softness improvement. The POD stays on the web surface and can be felt by a user's hands. From Table 4, it can be concluded that any POD with different ratios of AFFINITY/PRIMACOR material all demonstrate a trend: when its viscosity is low, the AFFINITY/PRIMACOR material tends to penetrate into web internal structure and cannot be felt by a user's hand. As the viscosity increases to a critical level, for example, 760 cps for the POD with a ratio of AFFINITY to PRIMACOR 60/40, AFFINITY/PRIMACOR stays primarily on the surface of the treated UCTAD due to resistance to flow into the web structure caused by high viscosity. This remains the same when its viscosity is further increased.

The critical level of the viscosity is called Critical Viscosity. For any POD dispersion, if the viscosity is higher than the Critical Viscosity, the polymeric components of the POD will stay on the surface of the web and after treatment, the coating chemistry can be felt by user's hands. However, it can be also concluded that as the ratio of AFFINITY to PRIMACOR is increased, the critical viscosity value is actually reduced.

Figure 4:
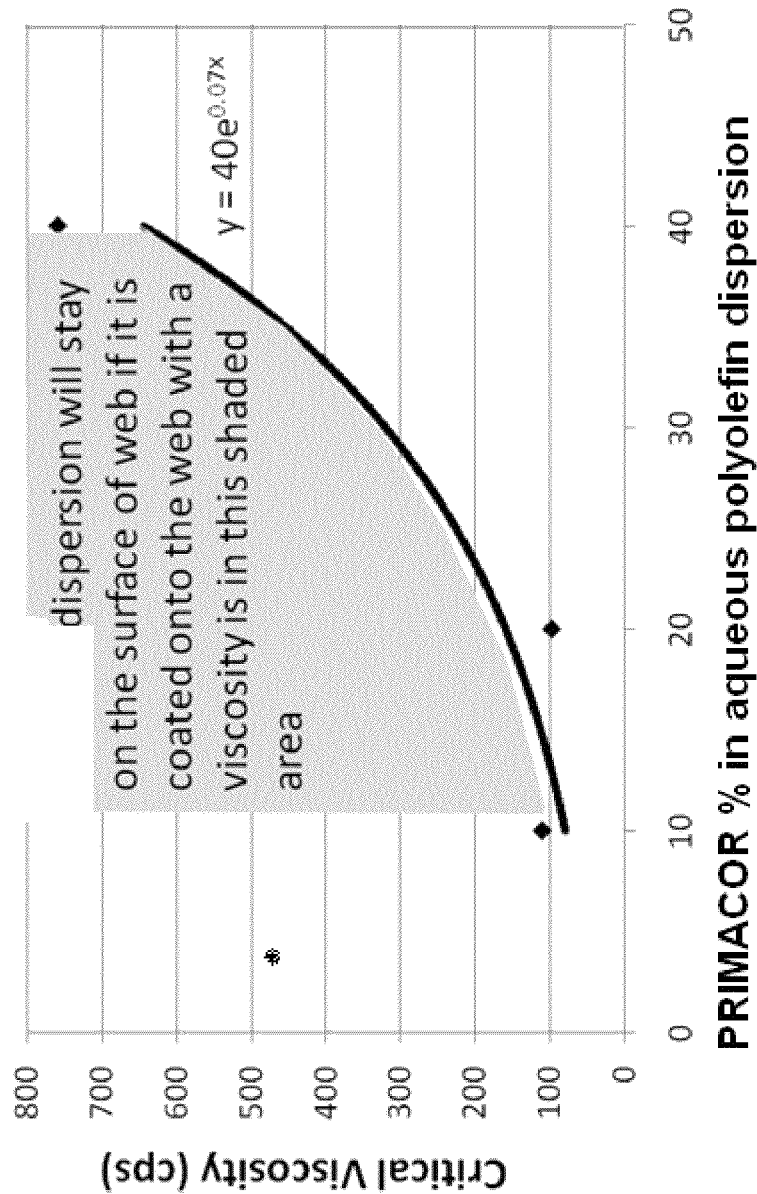
FIG. 4 is a chart demonstrating the relationship between the critical viscosity of POD versus the content level of a stabilizing agent.

It is known that PRIMACOR acts as an stabilizing agent in the POD and helps to stabilize AFFINITY dispersing particles in the dispersion. As the PRIMACOR content is reduced, the emulsifying power of the dispersion is reduced. This results in larger AFFINITY dispersing particles in the dispersion. The larger AFFINITY particles tend to be more capable of staying on the surface of web. Therefore, the need of having a high viscosity dispersion is correspondingly reduced. Thus, the critical viscosity value is reduced. FIG. 4 shows critical viscosities plotted against POD's PRIMACOR content. Let y represent critical viscosity (cP) while x represents the percentage of PRIMACOR in POD calculated without water. An empirical equation of $y=40\,e^{0.07x}$ is obtained by linear regression of the data in Table 4. This equation can be used to predict the critical viscosity value at a given emulsifier level of a dispersion. The POD will stay on the surface of a web if it is coated on the web with a viscosity above the curved line defined by of $y=40e^{0.07x}$.

The bold sections in Table 4 represents a viscosity range within which the POD will be able to stay on the surface of a web after surface coating. For any dispersion, it usually includes at least three components: a hydrophobic element similar to AFFINITY in POD, stabilizing agent (or dispersing agent) similar to PRIMACOR in POD, and water. For any dispersion, if the stabilizing agent content is known, the empirical equation described above can be used to select a suitable viscosity to achieve the coated structure of this invention.

TABLE 4

Effect of Hand Feel Results (IHR) of POD Surface Treated UCTAD with Different Viscosities and Chemical Compositions

| Affinity/Primacor | Viscosity, cP | | | | | |
|---|---|---|---|---|---|---|
| 60/40 without heat* | | | 347 | 525 | 760 | 2680 8300 |
| 60/40 with heat | | | | | 760 | 913 2680 8300** |
| 80/20 with heat | 50 | 97 | | | | |
| 90/10 with heat | 53 | 110 | | | | |

*Without heat indicate the drying took place at room temperature.
**With heat indicates a drying temperature of 120 C.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole and in part. Furthermore, those of ordinary skill in the art will appreciate that the foregoing description is by way of example only, and is not intended to limit the invention so further described in such appended claims.

The invention claimed is:

1. A web comprising greater than 50% cellulosic fibers having a bulk of greater than 3 cc/g and wherein said web comprises an aqueous polyolefin dispersion that is applied to the web by:
   (a) presenting the web having a first surface and an opposite second surface, and
   (b) applying the aqueous polyolefin dispersion on at least the first surface of the web without thoroughly penetrating the web, wherein the aqueous polyolefin dispersion has a viscosity of equal to or greater than a value calculated by an equation of $y=40\, e^{0.07x}$, wherein y represents viscosity in a unit of centipoises, and x is a percentage of the emulsifier content calculated without water; and wherein the aqueous polyolefin dispersion comprises polyolefin particles having a size of 0.5 microns to 3 microns, and a solids level of 30% to 60%; and
   (c) drying the web after the step of applying the aqueous polyolefin dispersion, wherein the particles are retained in particulate form.

2. The web of claim 1 wherein the step of drying the web is performed at ambient conditions.

3. The web of claim 1 wherein the step of drying the web is at a drying temperature of about 70° C.

4. The web of claim 1 wherein the web has a bulk of 3 cc/g to 20 cc/g.

5. The web of claim 1 wherein the step of applying the aqueous polyolefin dispersion on at least the first surface of the web is achieved by an application selected from the group consisting of spraying onto the web, extruding onto the web, foaming onto the web, and printing onto the web.

6. The web of claim 1 having an improvement in overall softness of 58% or greater than at least 0.2 according to the in Hand Ranking Test for Tactile Properties as defined herein.

* * * * *